US009217555B2

(12) United States Patent
Farmer

(10) Patent No.: US 9,217,555 B2
(45) Date of Patent: Dec. 22, 2015

(54) LED MODULE WITH INTEGRATED THERMAL SPREADER

(75) Inventor: Todd Farmer, Livermore, CA (US)

(73) Assignee: Bridgelux Incorporated, Livermore, CA (US)

( * ) Notice: Subject to any disclaimer, the term of this patent is extended or adjusted under 35 U.S.C. 154(b) by 482 days.

(21) Appl. No.: 13/109,979

(22) Filed: May 17, 2011

(65) Prior Publication Data

US 2012/0293652 A1 Nov. 22, 2012

(51) Int. Cl.

| | |
|---|---|
| ***H04N 7/18*** | (2006.01) |
| ***F21V 19/04*** | (2006.01) |
| ***F21V 29/00*** | (2015.01) |
| ***F21K 99/00*** | (2010.01) |
| ***H05B 37/02*** | (2006.01) |
| ***F21V 23/04*** | (2006.01) |
| *F21V 3/00* | (2015.01) |
| *F21Y 101/02* | (2006.01) |
| *F21V 29/71* | (2015.01) |

(52) U.S. Cl.

CPC ............... *F21V 19/045* (2013.01); *F21K 9/135* (2013.01); *F21V 23/045* (2013.01); *F21V 29/20* (2013.01); *H05B 37/0272* (2013.01); *F21V 3/00* (2013.01); *F21V 29/713* (2015.01); *F21Y 2101/02* (2013.01)

(58) Field of Classification Search

None

See application file for complete search history.

(56) References Cited

U.S. PATENT DOCUMENTS

| | | | | |
|---|---|---|---|---|
| 7,521,872 | B2 * | 4/2009 | Bruning | 315/158 |
| 2005/0046017 | A1 * | 3/2005 | Dangelo | 257/720 |
| 2005/0161682 | A1 * | 7/2005 | Mazzochette et al. | 257/79 |
| 2007/0007898 | A1 | 1/2007 | Bruning | |
| 2008/0117597 | A1 | 5/2008 | Zhou et al. | |
| 2009/0323340 | A1 * | 12/2009 | Yang et al. | 362/249.02 |
| 2011/0051414 | A1 * | 3/2011 | Bailey et al. | 362/235 |
| 2012/0092871 | A1 | 4/2012 | Farmer | |

OTHER PUBLICATIONS

Notification of Transmittal of the International Search Report and the Written Opinion, or the Declaration, International Search Report and Written Opinion in International Patent Application No. PCT/US12/37356 mailed Aug. 24, 2012.

International Preliminary Report on Patentability for International application No. PCT/US2012/037356 dated Nov. 19, 2013 from the International Bureau of WIPO.

Taiwan First Office Action dated Jan. 24, 2015, regarding Taiwan Application No. TW101117044, and English Translation.

* cited by examiner

*Primary Examiner* — Chikaodili E Anyikire

(74) *Attorney, Agent, or Firm* — Arent Fox LLP

(57) ABSTRACT

LED module with integrated thermal spreader. In an aspect, an LED module is provided that includes an LED light source, a driver connected to energize the LED light source, and a thermal spreader thermally coupled to at least one of the LED light source and the driver, the thermal spreader configured to provide a thermal conduction path to conduct heat energy away from the LED module. In another aspect, a lighting device includes a heat sink and an LED module mated with the heat sink. The LED module includes an LED light source, a driver connected to energize the LED light source, and a thermal spreader thermally coupled to at least one of the LED light source and the driver, the thermal spreader forming a thermal conduction path with the heat sink to conduct thermal energy away from the LED module.

44 Claims, 6 Drawing Sheets

LED MODULE WITH INTEGRATED THERMAL SPREADER

BACKGROUND

1. Field

The present application relates generally to light emitting diodes (LEDs), and more particularly, to an LED module with integrated thermal spreader.

2. Background

A light emitting diode comprises a semiconductor material impregnated, or doped, with impurities. These impurities add “electrons” and “holes” to the semiconductor, which can move in the material relatively freely. Depending on the kind of impurity, a doped region of the semiconductor can have predominantly electrons or holes, and is referred to as an n-type or p-type semiconductor region, respectively.

In LED applications, an LED semiconductor chip includes an n-type semiconductor region and a p-type semiconductor region. A reverse electric field is created at the junction between the two regions, which causes the electrons and holes to move away from the junction to form an active region. When a forward voltage sufficient to overcome the reverse electric field is applied across the p-n junction, electrons and holes are forced into the active region and combine. When electrons combine with holes, they fall to lower energy levels and release energy in the form of light. The ability of LED semiconductors to emit light has allowed these semiconductors to be used in a variety of lighting devices. For example, LED semiconductors may be used in general lighting devices for interior or exterior applications.

A typical LED lighting device comprises an LED semiconductor device, a large heat sink to dissipate thermal energy (or “heat”), and auxiliary components, such as driver circuits and connectors. The heat sink is large enough to dissipate heat generated by the LED semiconductor to facilitate proper operation of the LED and avoid overheating. As a result, LED lighting devices are typically provided as complete units including a large heat that is sized appropriately to dissipate heat.

Unfortunately, when such lighting devices need repair or it becomes desirable to utilize new or more efficient LED semiconductor devices, the entire lighting device is replaced. This typically means replacing the LED device as well as the heat sink, connectors, and other auxiliary components, even though the heat sink and auxiliary components did not fail. Replacing heat sinks and other auxiliary components that haven’t failed can be inefficient and expensive and it would be desirable to avoid this expense if possible.

Accordingly, what is needed is a simple, cost efficient and replaceable LED module having an integrated thermal spreader that can be used with a variety of external heat sinks and can itself be easily repaired or replaced without replacing the associated heat sink and/or auxiliary components.

SUMMARY

In various aspects, a replaceable LED module with integrated thermal spreader is disclosed. The LED module functions as a removable light source that can be installed in a variety of external heat sinks associated with different lighting devices. For example, the integrated thermal spreader facilitates the conduction of thermal energy into an external heat sink for dissipation to assure proper operation of the LED semiconductor. As improvements in LEDs and associated driver circuitry are made, only the replaceable LED module need be replaced allowing reuse of existing heat sinks and auxiliary components, such as connectors, thereby reducing costs and materials.

In an aspect, an LED module is provided that comprises an LED light source, a driver connected to energize the LED light source, and a thermal spreader thermally coupled to at least one of the LED light source and the driver, the thermal spreader configured to provide a thermal conduction path to conduct thermal energy away from the LED module.

In an aspect, a lighting device is provided that comprises a heat sink and an LED module mated with the heat sink. The LED module comprises an LED light source, a driver connected to energize the LED light source, and a thermal spreader thermally coupled to at least one of the LED light source and the driver, the thermal spreader forming a thermal conduction path with the heat sink to conduct thermal energy away from the LED module.

In an aspect, a lighting fixture is provided that comprises a lamp head and a lighting device connected to the lamp head. The lighting device comprises a heat sink and an LED module mated with the heat sink. The LED module comprises an LED light source, a driver connected to energize the LED light source, and a thermal spreader thermally coupled to at least one of the LED light source and the driver, the thermal spreader forming a thermal conduction path with the heat sink to conduct thermal energy away from the LED module.

In an aspect, a lighting system is provided that comprises a central controller and one or more lighting fixtures in communication with the central controller. Each lighting fixture comprises an LED module comprising an LED light source, a driver connected to energize the LED light source, and a thermal spreader thermally coupled to at least one of the LED light source and the driver, the thermal spreader configured to provide a thermal conduction path to conduct thermal energy away from the LED module.

It is understood that aspects of the present invention will become readily apparent to those skilled in the art from the following detailed description. As will be realized, the present invention includes other and different aspects and its several details are capable of modification in various other respects, all without departing from the spirit and scope of the present invention. Accordingly, the Drawings and Description are to be regarded as illustrative in nature and not as restrictive.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
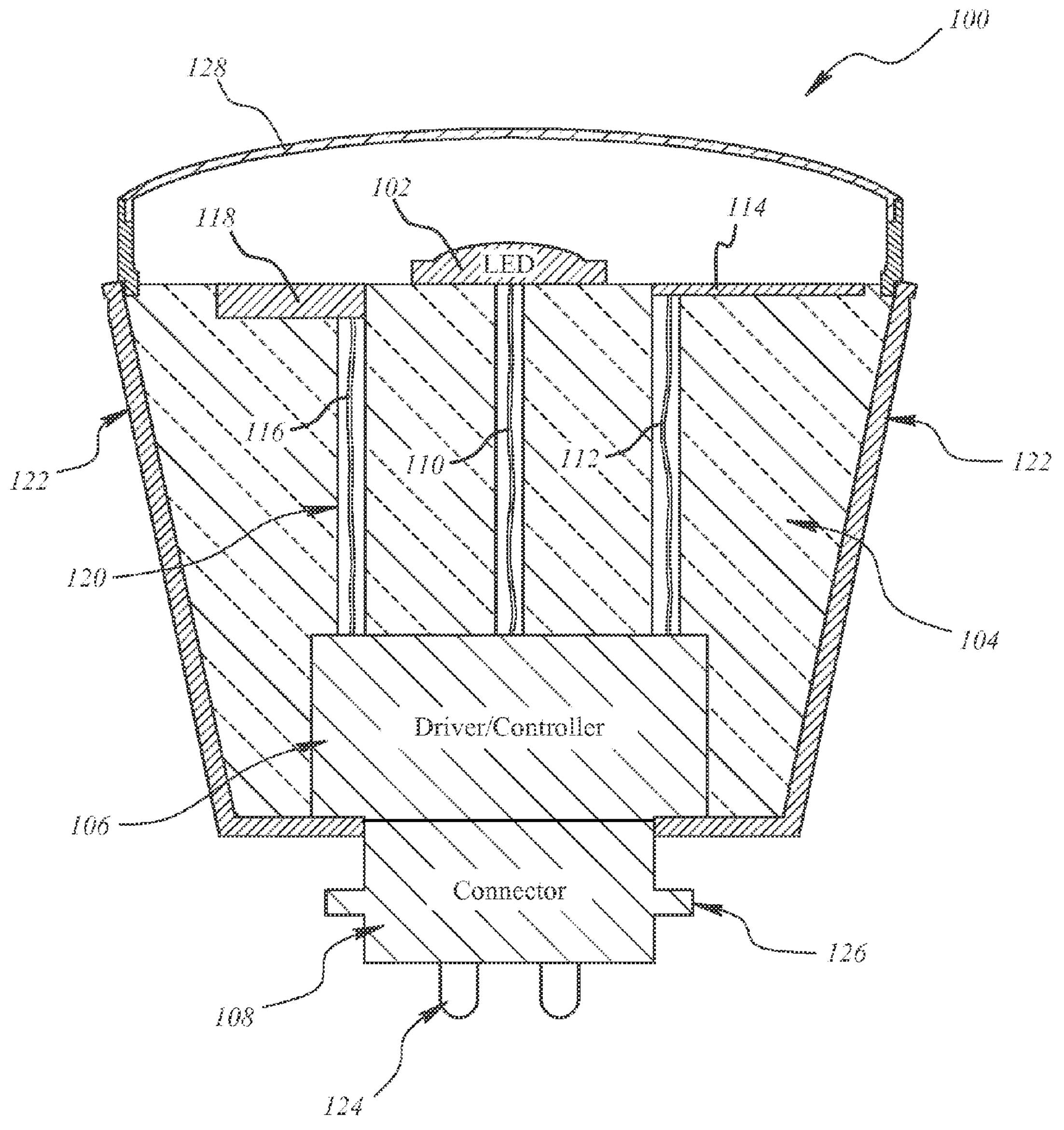
FIG. 1 shows an exemplary LED module with integrated thermal spreader.

Exemplary aspects of the present invention are described more fully hereinafter with reference to the accompanying drawings, in which various aspects of the present invention are shown. This invention may, however, be embodied in many different forms and should not be construed as limited to the various aspects of the present invention presented throughout this disclosure. Rather, these aspects are provided so that this disclosure will be thorough and complete, and will fully convey the scope of the present invention to those skilled in the art. The various aspects of the present invention illustrated in the drawings may not be drawn to scale. Accordingly, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes may not be intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the Drawings. By way of example, if an apparatus in the Drawings is turned over, elements described as being on the "lower" side of other elements would then be oriented on the "upper" sides of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items It will be understood that although the terms "first" and "second" may be used herein to describe various regions, layers and/or sections, these regions, layers and/or sections should not be limited by these terms. These terms are only used to distinguish one region, layer or section from another region, layer or section. Thus, a first region, layer or section discussed below could be termed a second region, layer or section, and similarly, a second region, layer or section may be termed a first region, layer or section without departing from the teachings of the present invention.

FIG. 1 shows an exemplary LED module 100 with integrated thermal spreader. For example, the module 100 is suitably constructed for use in interior and exterior lighting applications. The module 100 comprises an LED light source 102, thermal spreader 104, driver/controller 106, and connector 108.

The LED light source 102 comprises any suitable LED, LED array, LED emitters mounted on a substrate or printed circuit board, or an array of emitters. The LED light source 102 is coupled to the thermal spreader 104 so that thermal energy (also referred to simply as "heat") generated by the operation of the LED light source 102 conducts to the thermal spreader 104.

An optional cover or optic 128 covers the LED light source 102. In one exemplary implementation, the optic 128 provides environmental protection for the LED light source 102. In another exemplary implementation, the optic 128 performs functions, such as light extraction, beamforming, intensity control, and/or color adjustment associated with the light emitted from the LED light source 102. The optic 128 comprises plastic, glass, acrylic or other suitable material. In various implementations, the optic 128 can be clipped, screwed, glued, snapped in place, or otherwise mounted to the thermal spreader 104.

The driver/controller 106 (also referred to simply as "driver") comprises hardware and/or hardware executing software that is configured to generate drive signals carried on conductor 110 to energize the LED light source 102. In an exemplary implementation, the driver comprises a circuit configured to receive an AC or DC input signal and convert it to a drive signal configured to drive or energize the LED light source 102.

The driver 106 is also configured to receive and generate other types of signals. For example, the driver 106 operates to generate and receive communication signals associated with one or more antennas 114 to communicate with remote devices or systems. For example, the communication signals are carried between the driver 106 and the antennas 114 on conductor 112. The driver 106 also operates to send and receive interface signals carried on conductor 116 to interface with an accessory package 118.

Signals to and from the driver 106 are routed through openings in the thermal spreader 104, such as illustrated at 120. A more detailed description of the driver 106 and its operation is provided below.

The thermal spreader 104 comprises a thermally conductive material that has a high heat flux density, such as copper, aluminum, graphite, indium, ceramic, thermoplastic, composite material, or any other material suitable for conducting thermal energy. The thermal spreader 104 functions as a primary heat exchanger that moves heat from the LED module 100 to a secondary heat exchanger, such as an external heat sink that is larger in cross sectional area, surface area and/or volume. The high heat flux density of the thermal spreader 104 operates to "rapidly conduct" the heat to the secondary heat exchanger, which has a larger cross sectional area contacting the heat spreader 104 than it would if contacting the heat source directly, for instance, the LED light source 102.

The small size and/or shape of the thermal spreader 104 and the low heat transfer coefficient for air convection means that the thermal spreader 104 on its own is unable to provide sufficient air convection to dissipate enough thermal energy from the LED module 100 to an ambient environment to assure proper operation. Thus, the thermal spreader 104 is designed to be used in conjunction with a secondary heat exchanger, such as an external heat sink, to provide effective heat conduction to dissipate thermal energy from the module 100.

The thermal spreader 104 is configured to mate with an external heat sink to form a thermal conduction path to conduct heat from the LED module 100 to the external heat sink. The external heat sink can then dissipate the conducted heat, for example, by air convention, thereby facilitating heat removal to allow the LED module 100 to operate properly.

In one implementation, the thermal spreader 104 comprises thermal interface material (TIM) 122 at its surfaces that operates to facilitate heat conduction from the thermal spreader 104 to a secondary heat exchanger.

The connector 108 comprises electrical contacts 124 that operate to receive power and/or other signals that are routed to the driver 106. The connector 108 also comprises mounting and/or connecting features 126 configured to connect or mate the module 100 to an external heat sink. For example, in one implementation, when the features 126 are engaged with mating features of an external heat sink, the module 100 is firmly pressed into a position so that the surfaces of the TIM 122 press tightly with matching surfaces of the external heat sink to form a thermal conduction path to facilitate heat conduction from the thermal spreader 104 to the external heat sink.

Thus, the module 100 operates as a portable LED light component that is designed to be mated with an external heat sink. To facilitate heat conduction, the module 100 comprises the thermal spreader 104 that thermally couples to a secondary heat exchanger, such as an external heat sink, to form a thermal conduction path to facilitate heat conduction away from the LED module 100. As a result, the module 100 is not designed for stand-alone operation, but as a removable or pluggable component for use with an external heat sink.

As a removable component, the module 100 offers the advantage of easy installation, removal, repair, and replacement. For example, the module 100 can be easily removed for replacement as newer, improved, and more efficient LEDs and associated modules are developed. Furthermore, the module 100 provides efficiency and cost savings since the same heat sink and auxiliary components can be re-used when modules are replaced and/or upgraded.

Accessory Package

In one implementation, the module 100 comprises the accessory package 118 providing enhanced functionality and additional information to the driver 106. In one implementation, the accessory package 118 is mounted on a top surface of the thermal spreader 104. For example, the accessory package 118 comprises a solar detector configured to detect daytime and nighttime conditions. In another implementation, the accessory package 118 includes one or more devices and sensors such as a close circuit television camera (CCTV), motion sensor, RFID detector/emitter, infrared sensor, and/or any other type of device or sensor.

Antenna System

The antennas 114 are used by the driver 106 to communicate using any type of radio channel. For example, the driver 106 utilizes the antennas 114 to communicate using cellular, WiFi, Bluetooth or any other type of radio access technology. The antennas 114 can also receive global positioning signals that are passed to the driver 106 and from which the driver 106 determines the position of the module 100 at any particular time.

Figure 2:
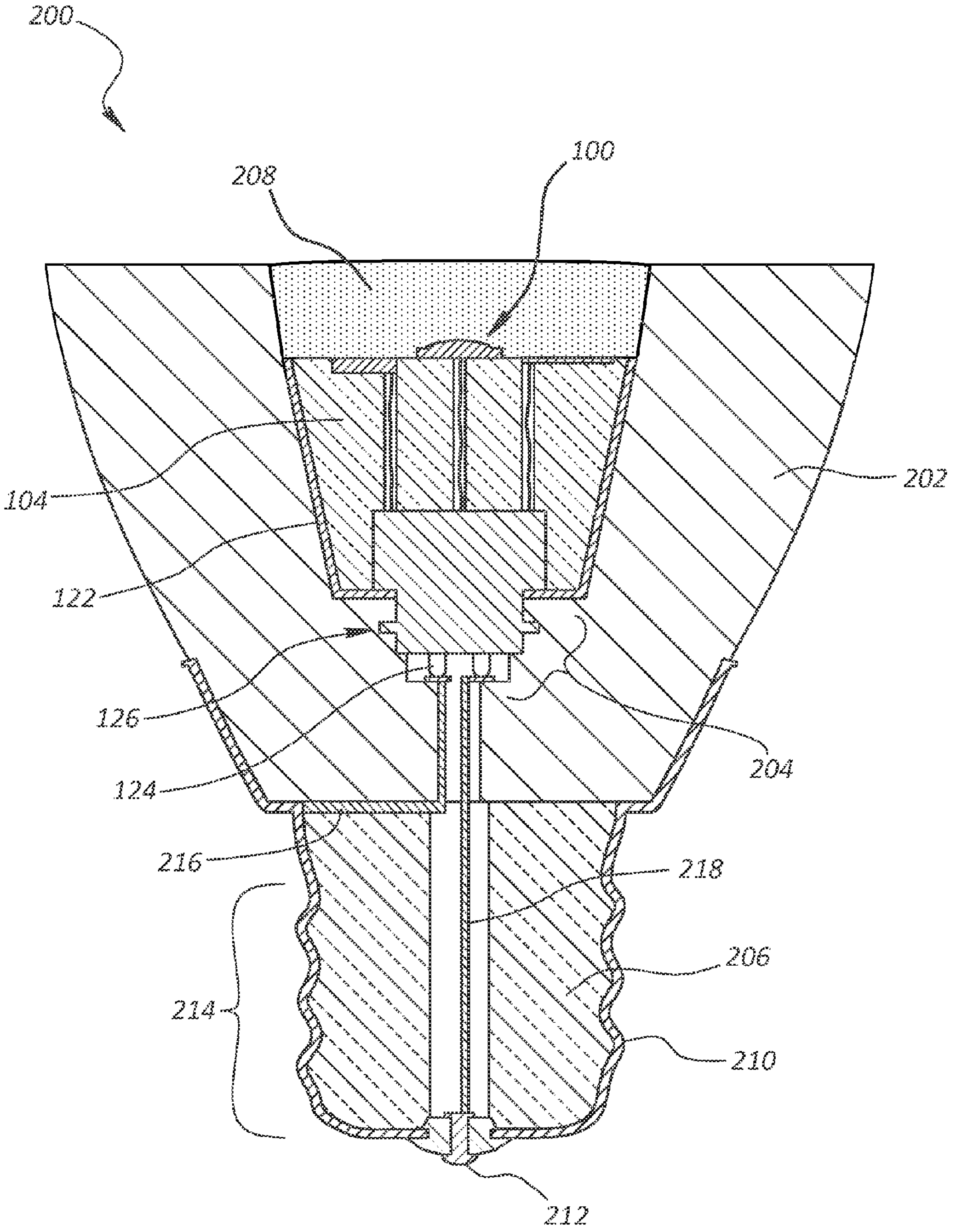
FIG. 2 shows an exemplary heat sink mated with the LED module of FIG. 1.

FIG. 2 shows an exemplary external heat sink 200 mated with the LED module 100 of FIG. 1. For example, the LED module 100 attaches to the heat sink 200 using the mounting features 126. The external heat sink 200 comprises heat dissipation material 202, internal socket 204 and connector 206.

The heat dissipation material 202 comprises metal or other heat dissipating material that is physically dimensioned to fit tightly with and thermally couple to the thermal spreader 104 of the installed module 100. For example, when the module 100 is installed in the heat sink 200, the surfaces of the TIM 122 press against surfaces of the heat dissipating material 202 and thermally couple the thermal spreader 104 to the heat dissipating material 202. In one implementation, the module 100 mechanically and electrically connects to the heat sink using the features 126 to mate with corresponding features of the connector 204. For example, when the module 100 is installed in the heat sink 200, the features 126 are engaged with corresponding features of the connector 204 and the TIM 122 presses firmly against surfaces of the heat dissipating material 202 to form a thermal coupling.

In an exemplary implementation, an optic 208 attaches to the heat sink 200 and acts to provide environmental protection for the LED light source 102. In another exemplary implementation, the optic 208 performs functions, such as light extraction, beamforming, intensity control, and/or color adjustment associated with the light emitted from the LED light source 102. The optic 208 comprises plastic, glass, acrylic or other suitable material. In various implementations, the optic 208 can be clipped, screwed, glued, snapped in place, or otherwise mounted to the heat sink material 202.

The connector 206 provides mechanical connection features 214 that are configured to mate with corresponding features of a lighting fixture to allow the device 200 to be installed in the lighting fixture. In an exemplary implementation, the connection features 214 comprise screw threads that allow the device 200 to be mechanically screwed into a mating socket of the lighting fixture. For example, the connection features 214 may form an Edison plug compatible with a standard Edison socket.

The connector 206 also comprises electrical contacts 210 and 212 that connect external signals to the module 100. For example, electrical conductors 216 and 218 electrically connect the contacts 210 and 212 to the contacts 124 of the module 100.

Thus, in an implementation, the heat sink 200 mated with the LED module 100 forms a PAR lamp, such as a PAR 20/30/38/ lamp. In another implementation, the heat sink 200 mated with the LED module 100 forms an MR16 or MR20 lamp.

Figure 3:
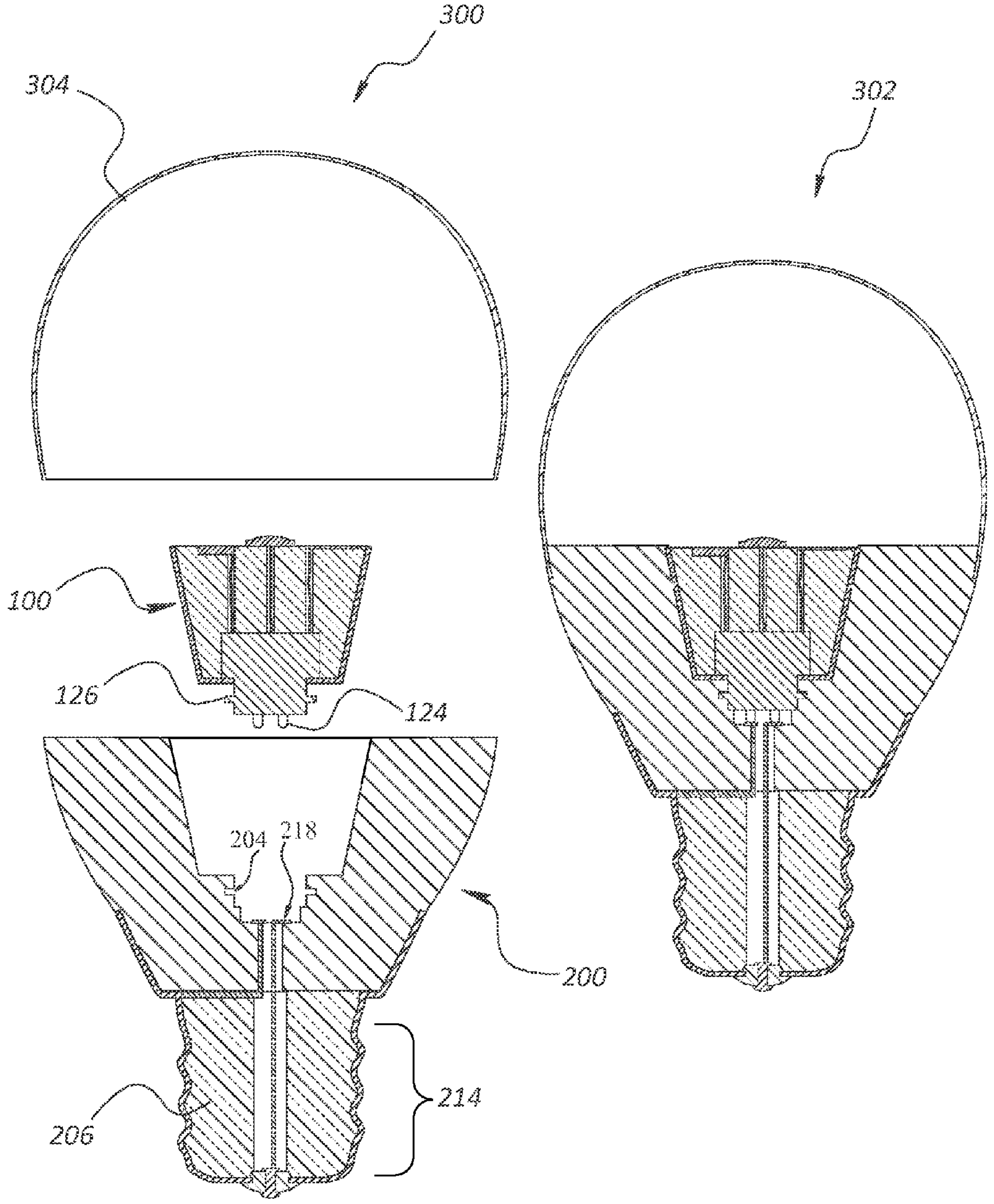
FIG. 3 shows exemplary exploded and assembled views of a lighting device comprising the LED module of FIG. 1.

FIG. 3 shows exemplary exploded and assembled views of a lighting device comprising the LED module 100 shown in FIG. 1.

Referring to the exploded view 300, the lighting device comprises external heat sink 200, LED module 100, and light diffuser 304. As illustrated in the exploded view 300, the LED module 100 operates as an “LED light engine” for the lighting device. Accordingly, if the lighting device needs repair or upgrading, only the LED module 100 needs to be replaced. The heat sink 200, diffuser 304 and any other components can be re-used thereby saving costs and materials.

Referring to the assembled view 302, the lighting device is shown completely assembled. For example, the LED module 100 is mated with the heat sink 200 and the diffuser 304 is also mated with the heat sink 200. Mating the LED module 100 with the heat sink 200 results in the features 126 of the LED module 100 mating with corresponding connector 204 of the heat sink 200, and the contacts 124 of the LED module 100 contacting corresponding contacts 218 of the heat sink 200.

The diffuser 304 is configured to diffuse and/or distribute light emitted from the LED module 100. In this example, the diffuser 304 is configured to have a round shape and therefore to allow the lighting device to simulate the look and light distribution of a typical light bulb. For example, the lighting device 302 forms an A19 or E27 bulb. However, in other implementations, the diffuser 304 can have any desired shape and/or optical properties. The connector 206 is also configured as a standard Edison screw type connector to allow the lighting device to be installed in a standard light bulb socket. However, in other implementations, the connector 206 is configured to mate with any other type of socket.

Figure 4:
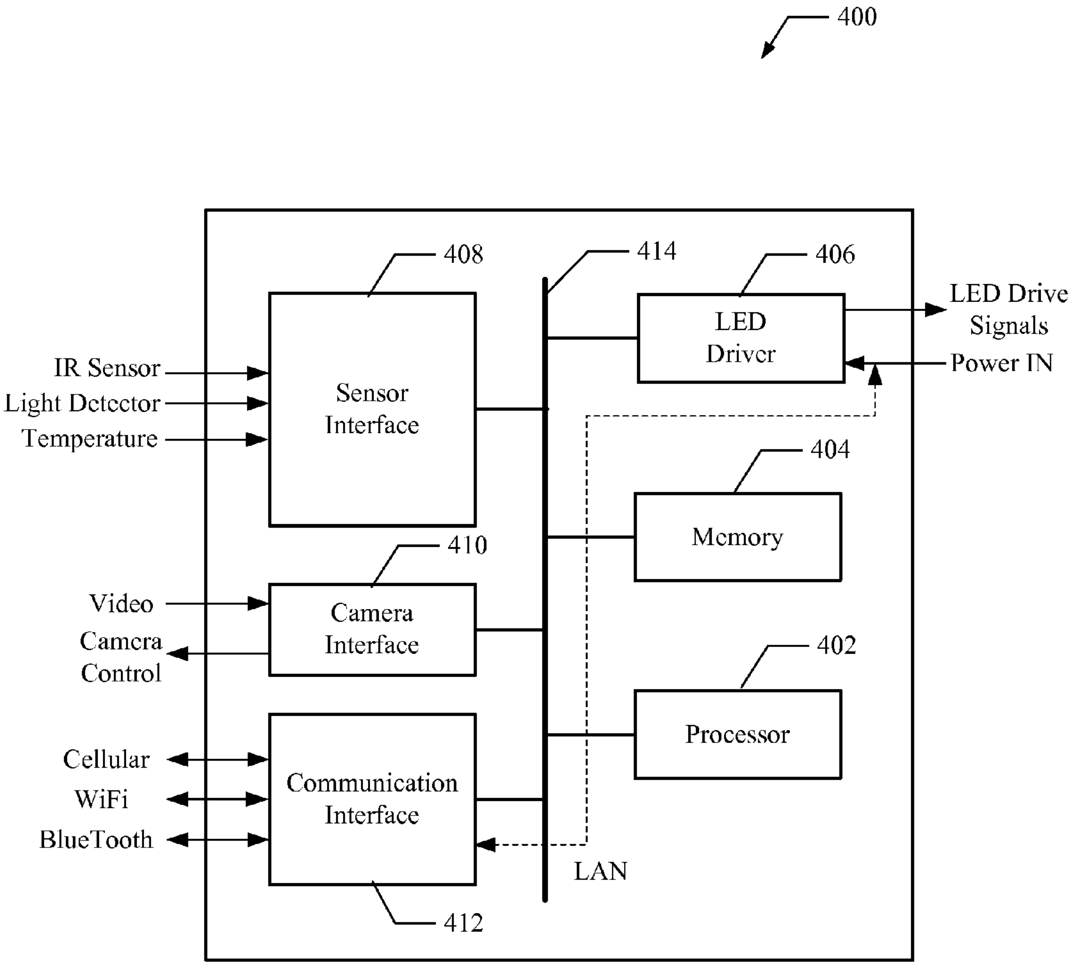
FIG. 4 shows an exemplary driver for use with the LED module of FIG. 1.

FIG. 4 shows an exemplary driver 400. For example, the driver 400 is suitable for use as the driver 106 of the LED module 100 shown in FIG. 1. The driver 400 comprises processor 402, memory 404, LED driver 406, sensor interface 408, camera interface 410, communication interface 412, all coupled to communicate over bus 414.

The processor 402 comprises at least one of a CPU, processor, gate array, hardware logic, memory elements, and/or hardware executing software. The processor 402 operates to control the operation of the functional elements of the driver 400. For example, in one implementation, the processor 402 executes program instructions stored in the memory 404, which cause the processor 402 to control one or more of the functional elements of the driver 400 to operate the LED light source, interface with the accessory devices, and/or communicate with external systems.

The memory 404 comprises RAM, ROM, hard disk, FLASH memory, or any type of memory resource that may be used to store information for use by the functional elements of the driver 400. In one embodiment, the memory 404 embodies program instructions executable the processor 402 to control the operation of the driver 400.

The LED driver 406 comprises hardware and/or hardware executing software that operates to generate drive signals that are used to drive an LED light source. For example, in one implementation, the driver 406 comprises amplifiers, transistor and/or discrete electrical components that are used to generate the LED drive signals. In one implementation, the driver 406 receives AC or DC power input signals that are converted or otherwise modified to produce the drives signals. In one implementation, the power input signals are received through an electrical path comprising the contacts 126, the connector 204, and the connector 206.

The sensor interface 408 comprises hardware and/or hardware executing software that allow the driver 400 to communicate with external sensors. For example, the external sensors comprise infrared sensors, light detectors, temperature sensors or other types of sensors. Information received from the sensors is passed to the processor 402.

The camera interface 410 comprises hardware and/or hardware executing software that operate to allow the driver 400 to interface with a camera to receive images and control the camera operation. For example, the interface 410 controls various camera operations, such as focus, zoom, pan, and aperture operations. The camera interface 410 operates to receive various images, such as still images, video, and any other type of CCTV images.

The communication interface 412 comprises hardware and/or hardware executing software that operate to allow the driver 400 to transmit and receive data and other information to/from external devices or systems utilizing the antennas 114 or through a hardwired local area network (LAN). For example, in one implementation, the communication interface 412 comprises logic to transmit/receive data and/or other information over wireless communication channels, such as cellular, WiFi, and Bluetooth communication channels using the antennas 114. In one implementation, the communication interface 412 comprises logic to transmit/receive data and/or other information over a hardwired LAN that is coupled to the power input line. Thus, when the LED module 100 is connected to receiver power, the same power connections provide LAN communications to the communication interface 412.

In an exemplary implementation, the interface 412 comprises logic to receive global positioning system (GPS) signals from the antennas 114 and these signals are passed to the processor 402 where they are processed to determine an exact position of the module 100. In still another exemplary implementation, the communication interface 412 comprises logic to send/receive data or instructions over a cellular channel with a central control entity. The data or instructions are passed to the processor 402 and the processor 402 controls the operation of the LED module 100 based on these instructions. In still another exemplary implementation, the communication interface 412 comprises logic to communicate directly with one or more other LED modules 100 using any suitable wireless communication or through the LAN interface. Communication with other LED modules 100 provides for coordinated activities between multiple modules that can be controlled by one or more particular modules or by a central control entity.

Figure 5:
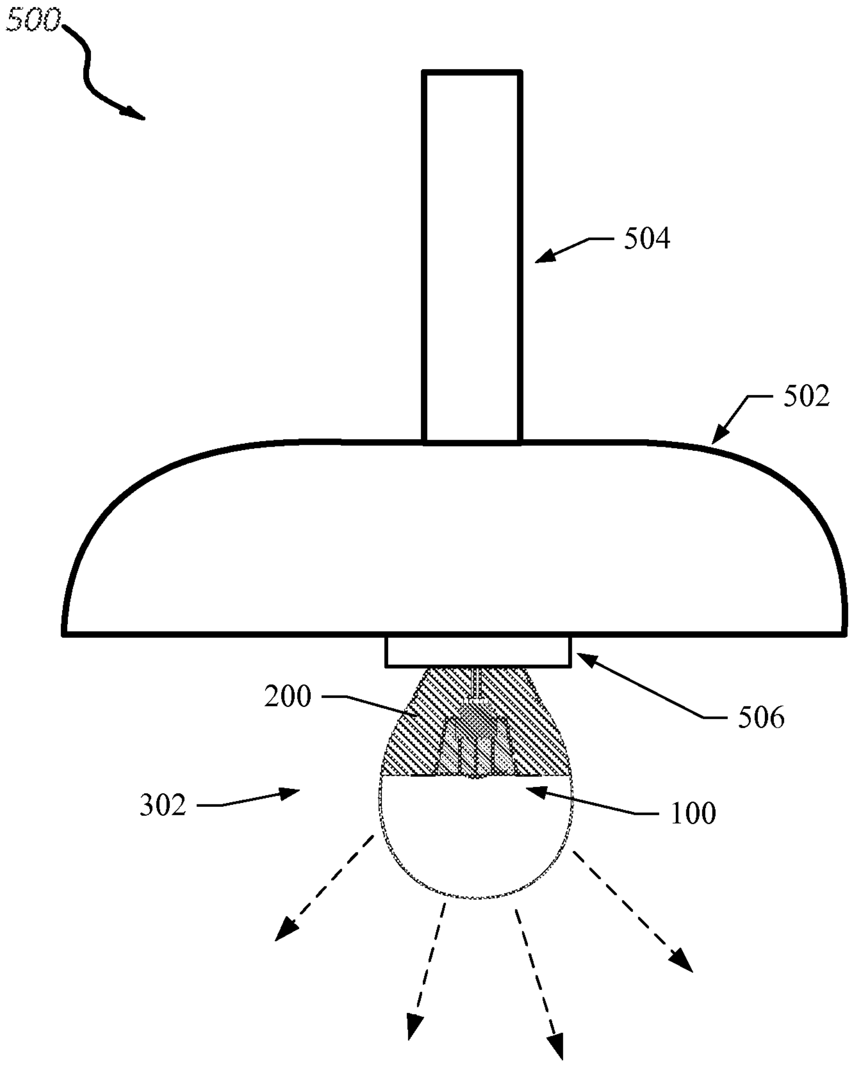
FIG. 5 shows an exemplary lighting fixture comprising the LED module of FIG. 1.

FIG. 5 shows an exemplary lighting fixture 500 configured to mount the lighting device 300. The lighting fixture 500 comprises a lamp head 502 mounted to a support member 504. For example, the support member 504 can be attached to a wall, ceiling or other structure to support the lamp head 502.

The lamp head 502 comprises a socket 506 that is configured to mate with the connector 206 of the lighting device 300. The lamp head provides power and any other signaling to the lighting device 300 through the socket 506. For example, power and signaling conductors are routed through the support member 504 and lamp head 502 to the socket 506 for connection to the lighting device 300.

Once installed in the socket 506, the lighting device 300 can communicate with external entities, such as central controllers, local equipment or local networks using a hardwired LAN or wireless communications provided by the antennas 114 and communication interface 412. For example, the communication interface 412 includes circuitry to communicate over cellular, WiFi, or Bluetooth radio channels. Thus, the lighting fixture 500 comprises the lighting device 300 which includes the module 100 mated with the external heat sink 200. In the case of upgrades or repairs, only the LED module 100 need be replace thereby allowing the heat sink and other components of the lighting device 302 to be reused.

Exemplary Installation

Figure 6:
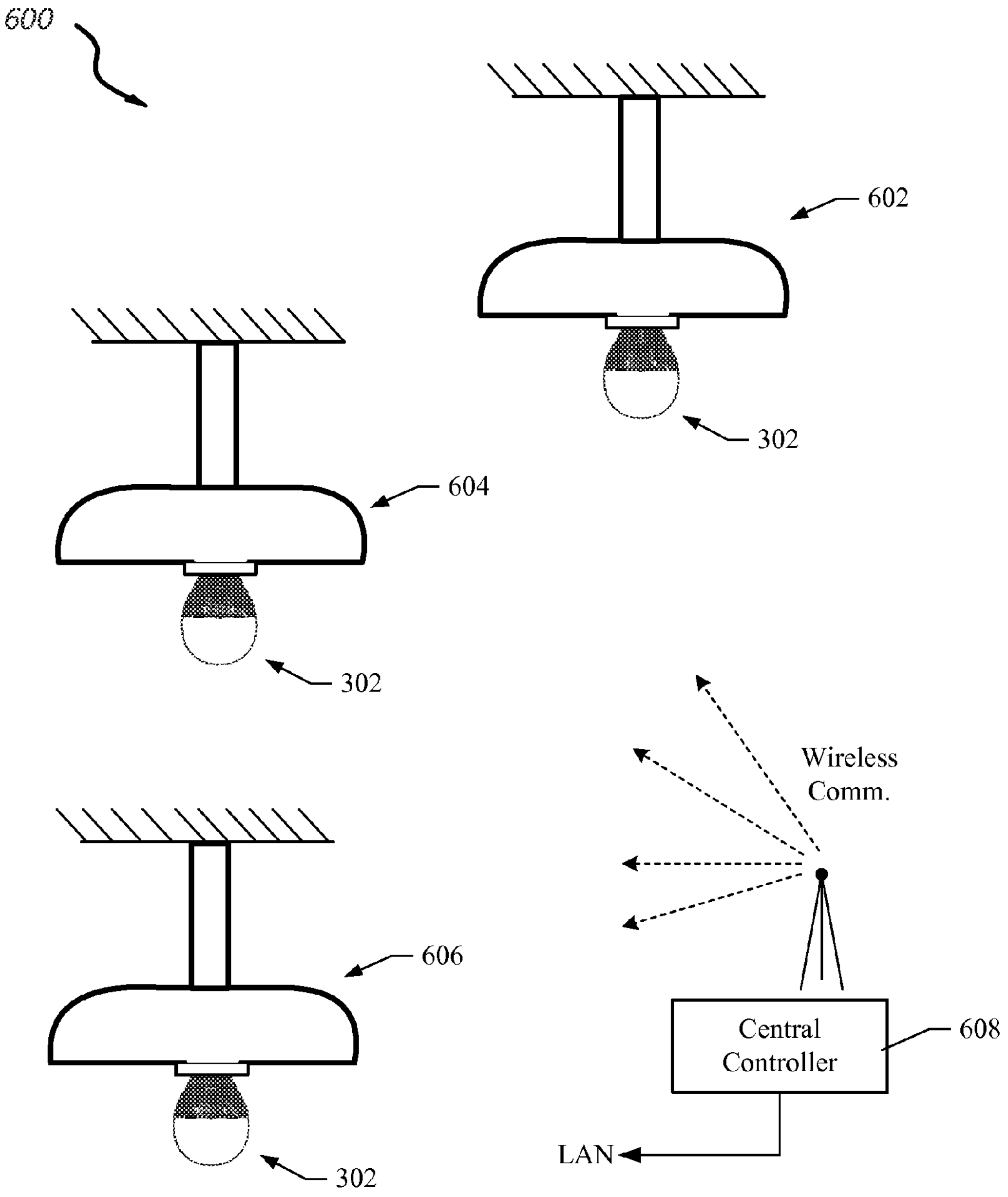
FIG. 6 shows an exemplary lighting system comprising the LED module of FIG. 1.

FIG. 6 shows an exemplary installation 600 illustrating three lighting fixtures (602, 604, and 606) installed at a location such as a building. The lighting fixtures are configured mate with the lighting devices 302. The lighting devices 302 are configured to operate under the control of a central controller 608 that communicates using wireless or LAN communications. For example, the central controller 608 comprises any suitable processor, CPU, computer, or processing device that communicates (wired or wirelessly) with the lighting devices 302 to control their lighting functions, determine their locations, or receive any information detected by sensors of the accessory package 118. A description of the types of functions that can be controlled by the central controller 608 is provided below.

Lighting Functions

The central controller 608 is operable to control the lighting device 302 at each of the lighting fixtures (602, 604, and 606) to provide the following illumination functions.

1. Illumination control
2. Heat detection
3. Energy use detection
4. Implementation of energy efficiency strategies (dimming, etc)

Camera Functions

The central controller 608 is operable to control a camera provided as part of the accessory devices 118 of the lighting devices 302 to provide the following camera functions.

1. Full motion video acquisition
2. Still images acquisition
3. Image detection
4. Day/Night detection Accessory Functions The central controller 608 is operable to acquired data from sensors provided as part of the accessory devices 118 of the lighting devices 302 to determine the following.

1. Temperature detection
2. Solar (day/night) detection
3. IR detection

Miscellaneous Functions

The central controller 608 is operable to provide the following miscellaneous functions.

1. Storing of sensor data and camera images
2. Providing access to store information
3. GPS position determination of each lighting device 302
4. Facilitating communications between the central controller 608 and other devices, such as nearby computers, cell phones, pagers or other local devices System Functions The central controller 608 is operable to provide the following system functions.

1. Coordinate lighting based user specifications or day/night conditions
2. Coordinate lighting to facilitate efficiency and/or power savings
3. Process images for crowd control and/or crime detection/prevention
4. Communicate with individuals using local wireless devices
5. Coordinate communications between multiple LED modules 100 to provide coordinated lighting and communication functionality The various aspects of this disclosure are provided to enable one of ordinary skill in the art to practice the present invention. Various modifications to aspects presented throughout this disclosure will be readily apparent to those skilled in the art, and the concepts disclosed herein may be extended to other applications. Thus, the claims are not intended to be limited to the various aspects of this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, while aspects of an LED module with integrated thermal spreader have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. An LED module comprising:

an LED light source;

a driver connected to energize the LED light source;

a connector extending from the driver; and a thermal spreader thermally coupled to at least one of the LED light source and the driver, the thermal spreader configured to be disposed within a cavity of a separate external heat sink and to provide a thermal conduction path to conduct thermal energy away from the LED module, wherein the thermal spreader comprises thermal interface material (TIM) at more than one external surface of the thermal spreader, and wherein the connector is configured to mate the LED module with the external heat sink.

2. The LED module of claim 1, the LED light source comprising at least one light source selected from a set of light sources comprising an LED, an LED array, and one or more LED emitters mounted on a substrate.

3. The LED module of claim 1, further comprising optics configured to cover the LED light source.

4. The LED module of claim 3, the optics configured to focus light emitted from the LED light source into a selected beam pattern.

5. The LED module of claim 1, the connector configured to provide at least one of a mechanical connection and an electrical connection to the LED module.

6. The LED module of claim 5, the connector comprising electrical contacts configured to route electrical signals to the driver.

7. The LED module of claim 1, wherein the (TIM) facilitates heat conduction from the thermal spreader to the external heat sink.

8. The LED module of claim 1, the thermal spreader comprising at least one material selected from a set of materials comprising copper, brass, aluminum, graphite, indium, ceramic, thermoplastic, and composite materials.

9. The LED module of claim 1, the thermal spreader comprising a surface configured to mate with a surface of the external heat sink to form the thermal conduction path through which thermal energy conducts from the thermal spreader to the external heat sink.

10. The LED module of claim 1, further comprising an antenna coupled to the driver.

11. The LED module of claim 10, the antenna configured to transmit and receive communication signals over one or more radio channels.

12. The LED module of claim 1, further comprising an accessory package connected to the driver and comprising at least one of a motion sensor, a camera, a closed circuit television camera (CCTV), and a temperature detector.

13. A lighting device comprising:

a heat sink having a cavity; and an LED module mated with the heat sink, the LED module comprising:

an LED light source;

a driver connected to energize the LED light source;

a connector extending from the driver; and a thermal spreader separate from the heat sink and thermally coupled to at least one of the LED light source and the driver, the thermal spreader being disposed within the cavity of the heat sink and forming a thermal conduction path with the heat sink to conduct thermal energy away from the LED module, wherein the thermal spreader comprises thermal interface material (TIM) at more than one external surface of the thermal spreader, and wherein the LED module is mated with the heat sink via the connector.

14. The lighting device of claim 13, the connector comprising at least one of a mechanical connection and an electrical connection to the heat sink.

15. The lighting device of claim 13, the LED light source comprising at least one light source selected from a set of light sources comprising an LED, an LED array, and one or more LED emitters mounted on a substrate.

16. The lighting device of claim 13, further comprising a diffuser configured to cover the LED module and diffuse light emitted from the LED light source.

17. The lighting device of claim 13, wherein the (TIM) facilitates thermal conduction from the thermal spreader to the heat sink.

18. The lighting device of claim 13, the thermal spreader comprising at least one material selected from a set of materials comprising copper, brass, aluminum, graphite, indium, ceramic, thermoplastic, and composite materials.

19. The lighting device of claim 13, further comprising an antenna connected to the driver.

20. The lighting device of claim 19, the antenna configured to transmit and receive communication signals over one or more radio channels.

21. The lighting device of claim 13, further comprising an accessory package connected to the driver and comprising at least one of a motion sensor, a camera, a closed circuit television camera (CCTV), and a temperature detector.

22. A lighting fixture, comprising:

a lamp head; and a lighting device connected to the lamp head, the lighting device comprising:

a heat sink having a cavity; and an LED module mated with the heat sink, the LED module comprising:

an LED light source;

a driver connected to energize the LED light source;

a thermal spreader separate from the heat sink and thermally coupled to at least one of the LED light source and the driver, the thermal spreader being disposed within the cavity of the heat sink and forming a thermal conduction path with the heat sink to conduct thermal energy away from the LED module, wherein the thermal spreader comprises thermal interface material (TIM) at more than one external surface of the thermal spreader, and wherein the LED module is mated with the heat sink via the connector.

23. The lighting device of claim 22, the connector comprising at least one of a mechanical connection and an electrical connection to the heat sink.

24. The lighting device of claim 22, the LED light source comprising at least one light source selected from a set of light sources comprising an LED, an LED array, and one or more LED emitters mounted on a substrate.

25. The lighting device of claim 22, further comprising a diffuser configured to cover the LED module and diffuse light emitted from the LED light source.

26. The lighting device of claim 22, wherein the (TIM) facilitates thermal conduction from the thermal spreader to the heat sink.

27. The lighting device of claim 22, the thermal spreader comprising at least one material selected from a set of materials comprising copper, brass, aluminum, graphite, indium, ceramic, thermoplastic, and composite materials.

28. The lighting device of claim 22, further comprising an antenna connected to the driver.

29. The lighting device of claim 28, the antenna configured to transmit and receive communication signals over one or more radio channels.

30. The lighting device of claim 22, further comprising an accessory package connected to the driver and comprising at least one of a motion sensor, a camera, a closed circuit television camera (CCTV), and a temperature detector.

31. A lighting system, comprising:

a central controller; and one or more lighting fixtures in communication with the central controller, each lighting fixture comprising:

a heat sink having a cavity; and an LED module comprising:

an LED light source;

a driver connected to energize the LED light source;

a connector extending from the driver; and a thermal spreader separate from the heat sink and thermally coupled to at least one of the LED light source and the driver, the thermal being disposed within the cavity of the heat sink and configured to provide a thermal conduction path to conduct thermal energy away from the LED module, wherein the thermal spreader comprises thermal interface material (TIM) at more than one external surface of the thermal spreader, and wherein the LED module is mated with the heat sink via the connector.

32. The lighting system of claim 31, each lighting fixture comprising:

a lamp head; and a lighting device connected to the lamp head, the lighting device comprising the heat sink mated the LED module via the connector to form a thermal conduction path to conduct thermal energy away from the LED module.

33. The lighting system of claim 31, the connector comprising at least one of a mechanical connection and an electrical connection to the heat sink.

34. The lighting system of claim 31, the LED light source comprising at least one light source selected from a set of light sources comprising an LED, an LED array, and one or more LED emitters mounted on a substrate.

35. The lighting system of claim 31, further comprising a diffuser configured to cover the LED module and diffuse light emitted from the LED light source.

36. The lighting system of claim 31, wherein the (TIM) facilitates thermal conduction from the thermal spreader to the heat sink.

37. The lighting system of claim 31, the thermal spreader comprising at least one material selected from a set of materials comprising copper, brass, aluminum, graphite, indium, ceramic, thermoplastic, and composite materials.

38. The lighting system of claim 31, further comprising an antenna connected to the driver.

39. The lighting system of claim 38, the antenna configured to transmit and receive communication signals over one or more radio channels.

40. The lighting system of claim 31, the LED module further comprising an accessory package connected to the driver and comprising at least one of a motion sensor, a camera, a closed circuit television camera (CCTV), and a temperature detector.

41. The LED module of claim 1, wherein the connector is external to the thermal spreader.

42. The lighting device of claim 13, wherein the connector is external to the thermal spreader.

43. The lighting device of claim 22, wherein the connector is external to the thermal spreader.

44. The lighting system of claim 31, wherein the connector is external to the thermal spreader.

* * * * *